Nov. 12, 1929.  W. J. PETERSON  1,735,787
PLOWLINE CLAMP
Filed May 20, 1929
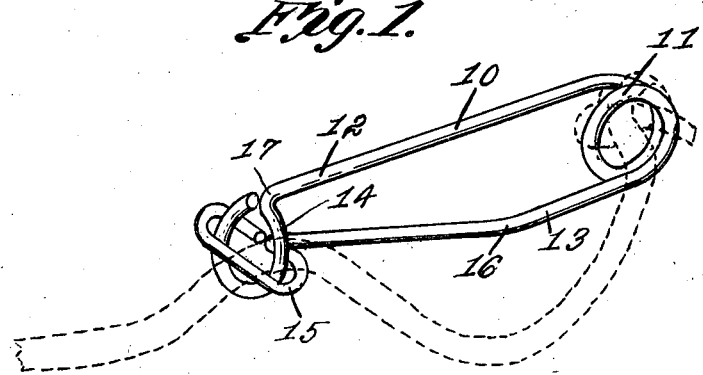
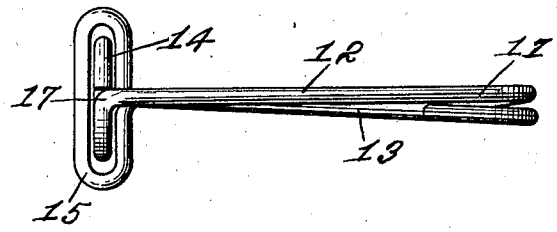
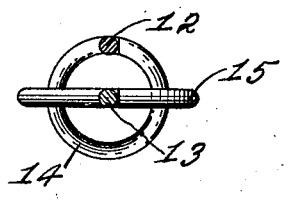

Patented Nov. 12, 1929

1,735,787

UNITED STATES PATENT OFFICE

WILLIAM J. PETERSON, OF THORNTON, ARKANSAS

PLOWLINE CLAMP

Application filed May 20, 1929. Serial No. 364,526.

This invention relates to clamps primarily designed for taking up slack or other looseness in rope lines and the like.

An object of the invention contemplates the provision and arrangement of means whereby the rope line may be pulled therethrough for adjustment and retained in adjusted position without requiring the usual necessity of forming knots or loops.

An additional object of the invention embodies the provision of spring elements for the clamp whereby the rope line will be yieldingly retained in regulated position to prevent said line from becoming broken incident to a sudden jerk or pull exercised thereon.

More specifically stated the spring elements are shaped to provide the aforementioned line engaging means upon the meeting portions thereof.

With the above and other objects in view, the invention further consists of the following novel features and details of construction, to be hereinafter more fully described, illustrated in the accompanying drawing and pointed out in the appended claim.

In the drawing:—

Figure 1 is a perspective view of the invention as applied and in use.

Figure 2 is a top plan view of the invention.

Figure 3 is a horizontal sectional view taken on line 3—3 of Figure 2.

Referring to the drawing in detail wherein like characters of reference denote corresponding parts, the reference character 10 indicates generally a link of spring wire bent upon itself at an appropriate point in the length thereof to define a spring loop designated as at 11. Arms 12 and 13, extended as continuations of the respective terminals of the spring 11, are shaped to provide circular and elongated loops or rings 14 and 15 upon the ends thereof. The elongated loop 15 is designed to accommodate the circular shaped loop 14 and for this reason the arm 13 must be offset as at 16 whereas the arm 12 is likewise distorted as at 17 to facilitate and accomplish the association.

The formation and arrangement of the spring loop 11 are such that the arms 12 and 13 therefor will transmit spring motion in opposite directions whereby the circular loop 14 will have a normal tendency to pull through the eye of the elongated loop. The rope line shown in dotted lines in Figure 1 of the drawing may represent, for purposes of illustration only, a plow line and is passed through the exposed eye portion of the circular loop 14 as same is projected for appreciable distances through the eye of the elongated loop. The end of the plow line is then passed through the eye or bore of the spring loop 11 and knotted. Compression of the arms 12 and 13 relatively will release tension of the loops 14 and 15 from the adjacent portions of the rope line to adjust same as desired.

Although I have shown my invention as applied upon the end of a rope line for removing slack therefrom, it is obviously understood that same may be equally and effectually as well applied at other points spaced from the ends of the line to remove any amount of slack therefrom. It is obviously understood that the wire 10 may be constructed of any desired gauge or size to meet the demands of the draft action upon the line and the size of the line to be accommodated.

The invention is susceptible of various changes in its form, proportions and minor details of construction, and the right is herein reserved to make such changes as properly fall within the scope of the appended claim.

Having thus described the invention, what is claimed is:—

A line clamp comprising a flexible element bent upon itself at an appropriate point in the length thereof to provide a spring loop, arms carried by and extended from the ends of the loop being sprung apart in oppositely disposed relation, an elongated horizontally disposed loop formed upon the extremity of one of the arms, and a circular shaped loop right-angularly disposed upon the end of the companion arm being projected within the eye of the horizontally disposed loop to facilitate accommodation of and lockingly retain a line passed therethrough against displacement.

In testimony whereof I affix my signature.

WILLIAM J. PETERSON.